US012711865B2

(12) United States Patent
Yamamoto et al.

(10) Patent No.: US 12,711,865 B2
(45) Date of Patent: Aug. 18, 2026

(54) OBJECT DETECTION DEVICE AND OBJECT DETECTION METHOD

(71) Applicant: Hitachi Astemo, Ltd., Hitachinaka (JP)

(72) Inventors: Keisuke Yamamoto, Tokyo (JP); Michihiko Ikeda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 513 days.

(21) Appl. No.: 18/035,727

(22) PCT Filed: Sep. 13, 2021

(86) PCT No.: PCT/JP2021/033549
§ 371 (c)(1),
(2) Date: May 5, 2023

(87) PCT Pub. No.: WO2022/113478
PCT Pub. Date: Jun. 2, 2022

(65) Prior Publication Data

US 2023/0410657 A1 Dec. 21, 2023

(30) Foreign Application Priority Data

Nov. 24, 2020 (JP) ................................ 2020-194708

(51) Int. Cl.
*G08G 1/16* (2006.01)

(52) U.S. Cl.
CPC .................................. *G08G 1/166* (2013.01)

(58) Field of Classification Search
CPC ....... G08G 1/167; G08G 1/166; G01S 13/931
See application file for complete search history.

(56) References Cited

U.S. PATENT DOCUMENTS 6,085,151 A * 7/2000 Farmer .................. G01S 7/023
701/96
12,164,058 B2 * 12/2024 Chebiyyam .......... G01S 13/931
(Continued)

FOREIGN PATENT DOCUMENTS

DE 102020209680 B3 * 1/2022 ............. G06V 20/58
EP 2306433 A1 * 4/2011 ........... G08G 1/0112
(Continued)

OTHER PUBLICATIONS

D. Musicki et al., "Integrated Probabilistic Data Association", IEEE Transactions on Automatic Control, Jun. 1994, vol. 39, No. 6, pp. 1237-1241 (5 pages).
(Continued)

*Primary Examiner* — Ladimir Magloire
*Assistant Examiner* — Kimberly Jenkins
(74) *Attorney, Agent, or Firm* — Foley & Lardner LLP

(57) ABSTRACT

A target detection device includes a fusion processing unit that processes fusion and outputs a prediction value of a target after fusion, a false detection estimation unit that estimates false detection for each target based on an observation value and a prediction value and outputs a false detection estimation result, a false detection probability calculation unit that calculates a false detection rate for each sensor based on the false detection estimation result, and a reliability correction unit that corrects reliability of a sensor defined in advance based on the false detection rate and outputs the corrected reliability. The fusion processing unit processes fusion based on the prediction value, the false detection estimation result, and the corrected reliability.

14 Claims, 8 Drawing Sheets

(56) References Cited

U.S. PATENT DOCUMENTS

| | | | | |
|---|---|---|---|---|
| 2005/0225477 | A1* | 10/2005 | Cong | B60K 31/0066 342/72 |
| 2009/0292468 | A1* | 11/2009 | Wu | G08G 1/165 342/146 |
| 2018/0281813 | A1 | 10/2018 | Emura et al. | |
| 2025/0076479 | A1* | 3/2025 | Kurz | G01S 7/40 |

FOREIGN PATENT DOCUMENTS

| | | | |
|---|---|---|---|
| JP | 2010-185824 | A | 8/2010 |
| JP | 2018-173816 | A | 11/2018 |
| WO | WO-2020/230645 | A1 | 11/2020 |

OTHER PUBLICATIONS

Huadong Wu et al., "Sensor Fusion Using Dempster-Shafer Theory", IEEE Instrumentation and Measurement Technology Conference, May 21-23, 2002, Anchorage, Alaska (7 pages).

Yaakov Bar-Shalom, "Tracking Methods in a Multitarget Environment", IEEE Transactions on Automatic Control, Aug. 1978, pp. 618-626, vol. 23, No. 4 (9 pages).

* cited by examiner

OBJECT DETECTION DEVICE AND OBJECT DETECTION METHOD

TECHNICAL FIELD

The present invention relates to a target detection device and a target detection method.

BACKGROUND ART

The target detection device receives output data from a sensor and detects a target. As such a target detection device, a method called probabilistic data association (PDA), which is a tracking method for stochastically synthesizing a plurality of observation values and prediction values and updating state estimation at the current time, has been proposed (see b of NPL 1).

Integrated probabilistic data association (IPDA) is known as a method for extending the state estimation of the PDA and simultaneously obtaining the existence probability of a tracking target (see NPL 2).

In addition, as a sensor fusion method for automobiles, a method using the Dempster-Shafer theory based on the fuzzy theory is known (see NPL 3).

On the other hand, in recent years, attention has been paid to a method of performing fusion in a state closer to original data to enhance an estimation result and realizing a target detecting function required for a driving assistance system and an automatic driving technology.

CITATION LIST

Non-Patent Literature

NPL 1: Y. Bar-Shalom, "Tracking methods in a multitarget environment," IEEE Trans. Automat. Contr., vol. 23, no. 4, pp. 618-4526, August 1978.

NPL 2: Musicki D., Evans R., Stankovic S., "Integrated Probabilistic Data Association (IPDA)", IEEE Trans. Autom. Control., vol. 39, no. 6, pp. 1237-1241, June 1994

NPL 3: Huadong Wul, et al., "Sensor Fusion Using Dempster-Shafer Theory", IEEE IMTC Anchorage 2002.

SUMMARY OF INVENTION

Technical Problem

In the conventional target detection device, in a case where a plurality of types of sensors are used, there are many use scenes in which characteristics deteriorate because each sensor has advantages and disadvantages. For a specific use scene, characteristic deterioration can be prevented by setting reliability of a sensor in advance and detecting the scene. However, in a situation where it is difficult to detect deterioration of sensor characteristics or a scene that occurs in a relatively short period of time, it is difficult to prevent characteristic deterioration.

In addition, it is not realistic to set parameters in advance for a very large number of use scenes from the viewpoint of data collection and implementation cost for setting.

For this reason, there is a demand for a method of improving the fusion result of the plurality of sensors by appropriately setting the reliability of the sensor according to the use scene.

An object of the present invention is to improve a fusion result of a plurality of sensors by appropriately setting reliability of a sensor according to a use scene in a target detection device.

Solution to Problem

A target detection device according to one aspect of the present invention relates to a target detection device that detects a target based on a plurality of observation values output from a plurality of types of sensors, the target detection device including a fusion processing unit that processes fusion and outputs a prediction value of the target after fusion; a false detection estimation unit that estimates a false detection for every target based on the observation value and the prediction value and outputs a false detection estimation result; a false detection probability calculation unit that calculates a false detection rate for every sensor based on the false detection estimation result; and a reliability correction unit that corrects a reliability of the sensor defined in advance based on the false detection rate and outputs the corrected reliability; where the fusion processing unit processes the fusion based on the prediction value, the false detection estimation result, and the corrected reliability.

A target detection device according to one aspect of the present invention relates to a target detection device including a fusion object recognition unit that receives a plurality of pieces of output data from a plurality of types of sensors and detects a target based on the plurality of pieces of output data, the target detection device including a false detection estimation unit that estimates a false detection of the target based on a detection result of the target after fusion in a temporally previous step; and a sensor reliability detection unit that estimates reliability of a sensor in a predetermined scene in units of the plurality of types of sensors based on the estimation result of the false detection; where the target is detected on the basis of the corrected reliability based on the reliability of the sensor, the estimation result of the false detection, and the output data.

A target detection method according to one aspect of the present invention relates to a target detection method that detects a target based on a plurality of observation values output from a plurality of types of sensors, the target detection method including a fusion processing step of processing fusion and outputting a prediction value of the target after fusion; a false detection estimation step of estimating a false detection for each target based on the observation value and the prediction value and outputting a false detection estimation result; a false detection probability calculation step of calculating a false detection rate for each sensor based on the false detection estimation result; and a reliability correction step of correcting a reliability of the sensor defined in advance based on the false detection rate and outputting the corrected reliability; where the fusion processing step processes the fusion based on the prediction value, the false detection estimation result, and the corrected reliability.

Advantageous Effects of Invention

According to one aspect of the present invention, in a target detection device, a fusion result of a plurality of sensors can be improved by appropriately setting the reliability of a sensor according to a use scene.

DESCRIPTION OF EMBODIMENTS

Figure 1:
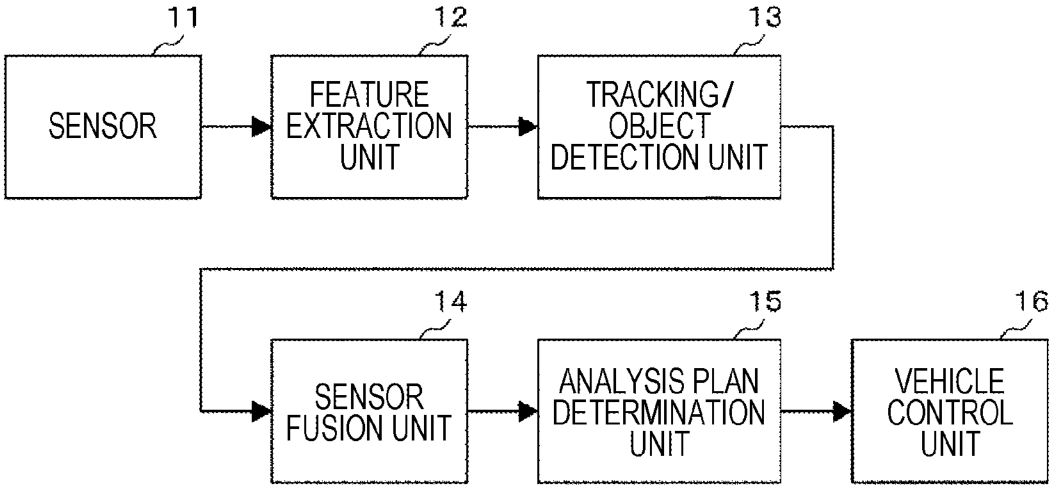
FIG. 1 is a diagram showing a configuration of a target detection device.

Hereinafter, examples will be described with reference to the drawings.

A configuration of a target detection device will be described with reference to FIG. 1.

The object detection device includes a sensor 11, a feature extraction unit 11, a tracking/object detection unit 13, a sensor fusion unit 14, an analysis plan determination unit 15, and a vehicle control unit 16. The data acquired by the sensor 11 is cleansed by the feature extraction unit 12, and is subjected to tracking process and object detection process by the tracking/object detection unit 13 to become target data.

The target data is used for travel route and control plan determination by the analysis plan determination unit 15, and vehicle control is performed by the vehicle control unit 16 based on such a result. The present invention relates to the tracking and object detection unit 13 and the sensor fusion unit 14 in the object detection system.

In FIG. 1, sensor fusion is performed on the target data. In this case, a method of synthesizing target data with a simple probability not including a physical model or a method using D-S theory expressing imperfection of a sensor based on fuzzy theory is often used as fusion.

Figure 2:
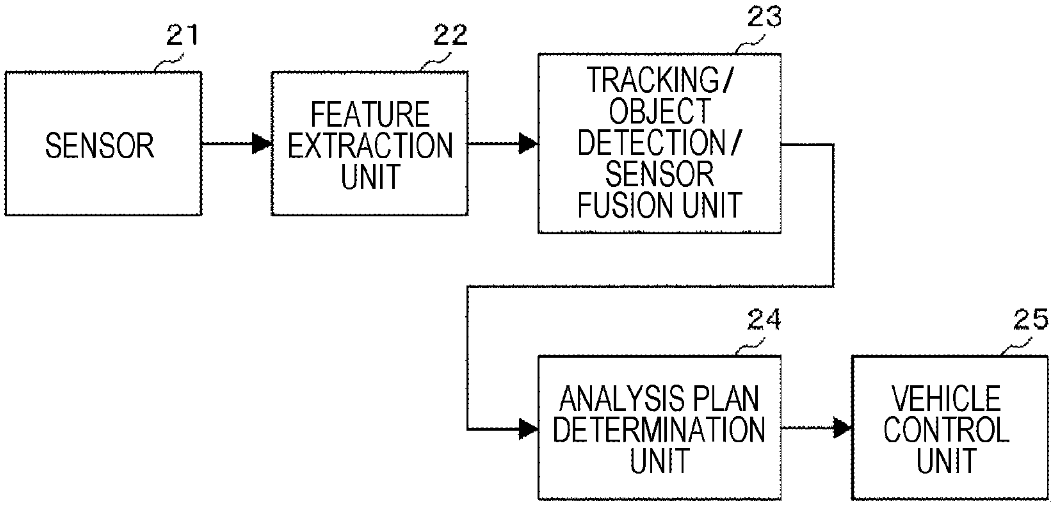
FIG. 2 is a diagram showing a configuration of the target detection device.

Other configurations of the target detection device will be described with reference to FIG. 2.

The object detection device includes a sensor 21, a feature extraction unit 22, a tracking/object detection/sensor fusion unit 23, an analysis plan determination unit 24, and a vehicle control unit 25. A difference from the target detection system illustrated in FIG. 1 is that tracking, object detection, and sensor fusion 23 are integrated in the target detection system illustrated in FIG. 2, and synthesis is directly performed on an observation value from the sensor 21. In this case, a method of calculating a probability distribution of a target when an observation value is obtained using Bayes' theorem based on norms such as a minimum-mean-squared error (MMSE), a maximum likelihood estimation (ML), and a maximum A-posteriori estimation (MAP) is used. In the method of FIG. 2, although the calculation amount increases, generally better characteristics can be obtained than in the case where fusion is performed on the target of FIG. 1.

An object detection device according to the present invention is obtained by adding a function of adaptively changing reliability according to a use scene to a sensor fusion method using stochastic synthesis, and a sensor fusion method using stochastic synthesis to be assumed will be described with reference to FIGS. 3 to 6.

Figure 3:
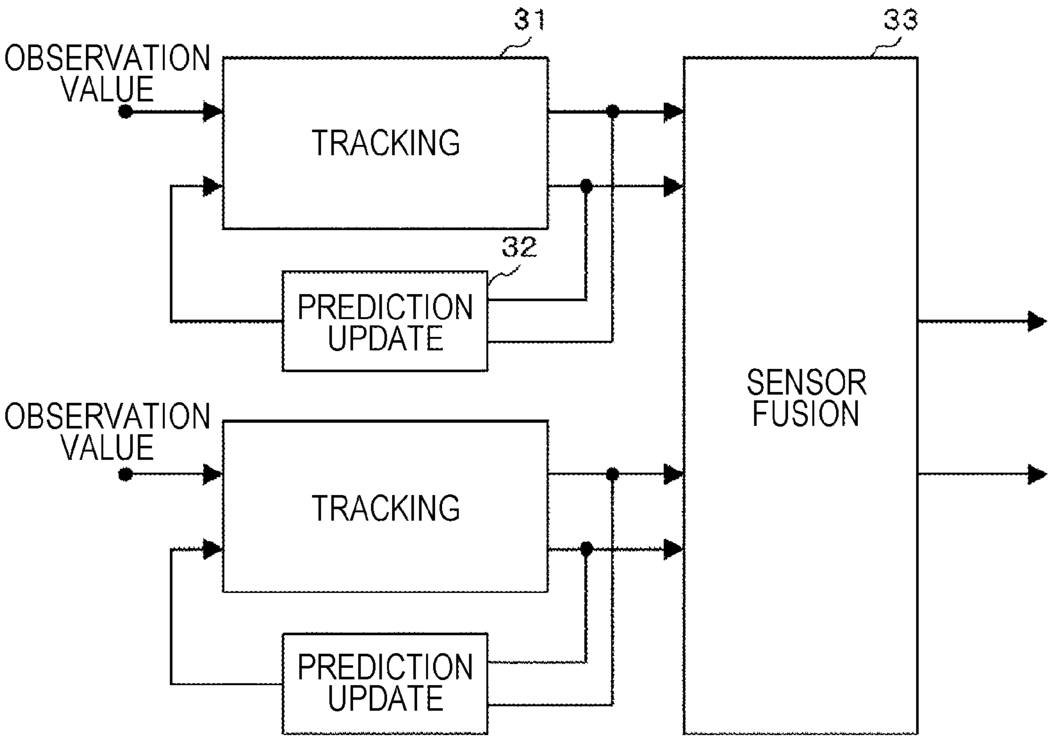
FIG. 3 is a diagram illustrating functional blocks of sensor fusion.

Functions of the tracking/object detection unit 13 and the sensor fusion unit 14 in FIG. 1 will be described with reference to FIG. 3.

The observation value of each sensor is synthesized with the prediction update value 32 of each sensor by tracking process 31. The state vector, the covariance matrix, the target information, the existence probability, and the like of the output of tracking are once calculated for every sensor, and the sensor fusion 33 is performed on the calculated object data. In the current sensor fusion system for automatic driving, studies using the D-S theory with a good balance between calculation amount and performance are often conducted, and the sensor fusion system can be used in the object detection device of the present invention.

Figure 4:
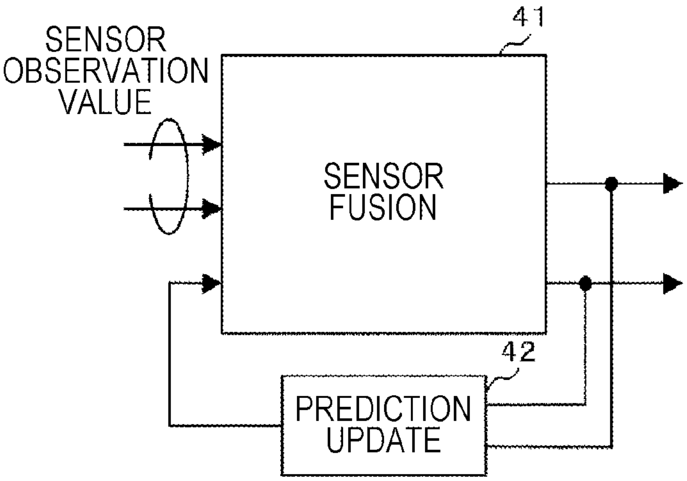
FIG. 4 is a diagram illustrating functional blocks of sensor fusion.

Functions of the tracking/object detection/sensor fusion unit 23 in FIG. 2 will be described with reference to FIG. 4.

When the sensor fusion 41 is directly performed on the observation value from each sensor, the tracking and the sensor fusion can be integrated by extending the tracking method of synthesizing a plurality of observation values and a target by a single sensor to a multi-sensor. In this case, the output of the prediction update 42 using the fusion result and the observation values of the plurality of sensors are stochastically integrated based on the Bayes estimation.

For example, Probabilistic Data Association (PDA) is known as a fusion method of the MMSE standard using the Kalman filter. In addition, Integrated PDA (IPDA) is known as a method of extending the PDA and simultaneously calculating the existence probability of the target, and such IPDA is extended to a multi-sensor to obtain a fusion output. In the object detection unit of the present invention, the fusion process is performed based on stochastic synthesis in either case of FIGS. 3 and 4.

Figure 5:
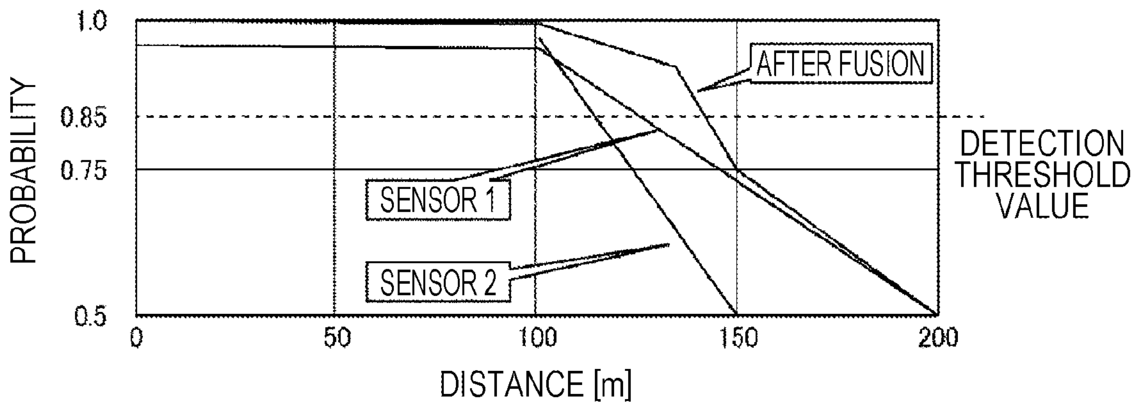
FIG. 5 is a diagram explaining an effect of the sensor fusion.

Effects to be achieved in stochastic synthesis of observation values will be described with reference to FIG. 5. FIG. 5 illustrates an example of reliability in a case where stochastic synthesis is performed by sensor fusion in a model in which the respective probabilities of the sensor 1 and the sensor 2 change with distance.

Here, in a case where target data greater than or equal to the detection threshold value leads to the subsequent stage, if determination is performed in each of the sensor 1 and the sensor 2, a region of greater than or equal to 130 m cannot be detected. On the other hand, in a case of the configuration in which the sensor output is synthesized as the probability and the determination is made after the fusion, the detection region can be expanded to around 140 m.

Figure 6A:
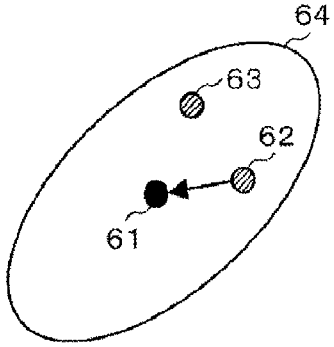
FIG. 6A is a diagram explaining an outline of the sensor fusion.
Figure 6B:
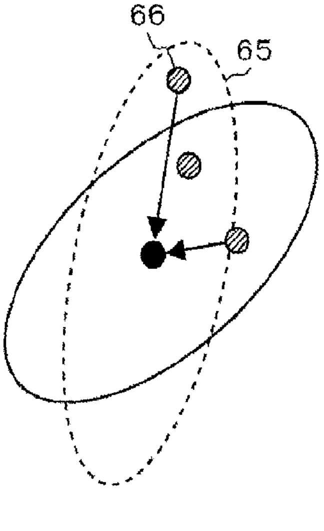
FIG. 6B is a diagram explaining an outline of the sensor fusion.

FIGS. 6A and 6B are diagrams describing a principle of improvement of state estimation by fusion. FIG. 6A illustrates a state of synthesizing a plurality of observation values 62 and 63 and a prediction value 61 using a PDA method with a single sensor. The PDA is a fusion method of MMSE standard that assumes tracking by the Kalman filter, and the state vector x to be estimated is a conditional state vector of the observation value Z. The MMSE standard is used to take an expected value for the combination event θ of the observation value and the prediction value.

Here, the formula $\beta_i = P\{\theta|Z\}$ is an association probability of each event θ. Now, in FIG. 6A, consideration is made to link the observation values 62 and 63 to the prediction value 61.

Now, assuming that a correct observation value associated with each target in one time step is less than or equal to 1 (Point target assumption), an observation value of a correct association is 62 or 63, or "no correct association". If the observation value 62 is a correct association, the observation value 63 is a false detection. On the other hand, an event hypothesis in which 63 is correct and 62 is false detection is also conceivable on the contrary, and both are averaged with a weight based on the likelihood to calculate the fusion output.

Here, in a case of extending to a multi-sensor, as illustrated in FIG. 6B, the prediction range 66 of the observation value based on the sensor 2 and the observation value 66 of the sensor 2 are added, and similarly, when an expected value is taken for all possible event hypotheses, a combined gain occurs and the accuracy of state estimation increases when the observation value 66 of the sensor 2 is a correct observation value.

On the other hand, in a case where such a method is used, if the certainty of different sensors is not appropriately set, the likelihood of a wrong hypothesis increases, and thus, a method of adaptively adjusting the reliability of the sensor becomes important.

Therefore, in the present invention, a function of estimating a false detection rate for each sensor is added to the fusion function, and estimation accuracy after fusion is enhanced in various use scenes.

Next, an example of the present invention will be described with reference to FIGS. 7 to 13.

First Example

Figure 7:
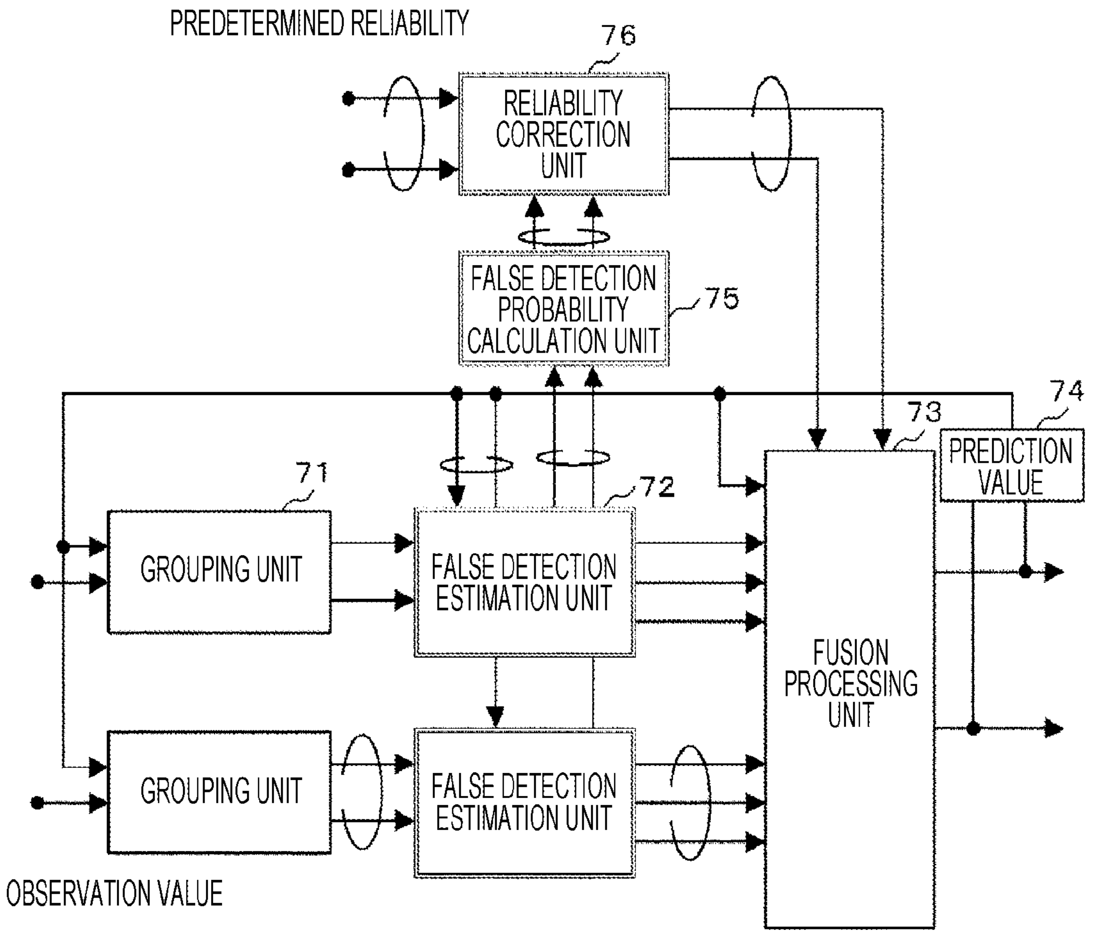
FIG. 7 is a diagram showing a configuration of the target detection device according to a first example.

A configuration of a target detection device of a first example will be described with reference to FIG. 7. FIG. 7 illustrates functional blocks of a target detection unit using sensor fusion that adaptively estimates the reliability of a sensor according to the first example. Hereinafter, false detection includes false detection and non-detection.

A target detection device of the first example includes a grouping unit 71 that groups a prediction value and an observation value using a prediction value of a target after fusion (a result of prediction update of a fusion result), a fusion processing unit 73 based on a probability, a false detection estimation unit 72 that estimates false detection for each target using the observation value and the prediction value after fusion, a false detection probability calculation unit 75 that estimates a false detection rate in units of sensors from a false detection result of the false detection estimation unit 72, and a reliability correction unit 76 that corrects a predetermined reliability of a sensor on the basis of the false detection rate for each sensor of the false detection calculation.

The grouping unit 71 creates group information indicating a correspondence status between the prediction value and the observation value of the target from the prediction value after fusion and the observation value of the sensor. The false detection estimation unit 72 performs false detection estimation for each target (for each prediction value) by using the group information, the observation value, and the prediction value after fusion from the grouping unit 71.

The false detection probability calculation unit 75 estimates a false detection probability in units of sensors from a false detection estimation result. The reliability correction unit 76 corrects the reliability of the predetermined sensor on the basis of the false detection probability in units of sensors from the false detection probability calculation unit 75. The fusion processing unit 73 performs fusion processing based on the group information, the observation value, the false detection estimation result, the corrected sensor reliability, and the prediction value, and outputs a state vector, a covariance matrix, an existence probability, and the like.

Figure 8:
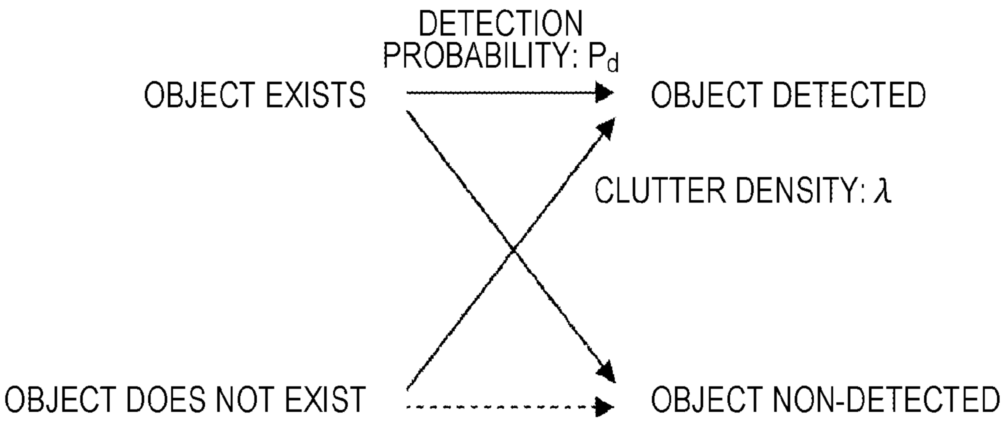
FIG. 8 is a diagram illustrating an example of sensor reliability used for fusion according to the first example.

Here, an example of a parameter used as the reliability of the sensor is illustrated in FIG. 8.

When the relationship between the presence or absence of the object and the detection result is illustrated in FIG. 8, the false detection can be linked to the clutter density A and the non-detected detection probability Pd. Since the detection probability and the clutter density can be used in the association probability β of the PDA method, it is possible to adaptively estimate the reliability in units of sensors from the detection result by using the detection probability and the clutter density as the reliability of the sensor.

In the first example, a case where the PDA method is used is illustrated, but regarding fusion with respect to the object data, a method of adaptively changing the reliability of the sensor according to the use scene can be applied by changing the parameter of uncertainty of the sensor used in the synthesis based on the D-S method according to the false detection and the non-detection.

The function of the false detection estimation unit 72 will be described with reference to FIGS. 9A, 9B, and 9C.

The false detection estimation unit 72 estimates the non-detection rate and the false detection frequency for each target using the prediction value 94 of the fusion result. Here, 91 to 93 is a prediction range of an observation value, 94, 96, and 97 are prediction values of a target, and 98 is an observation value.

Figure 9A:
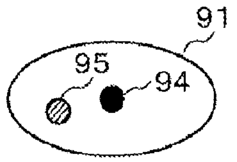
FIG. 9A is a diagram illustrating functions of a false detection estimation unit according to the first example.
Figure 9B:
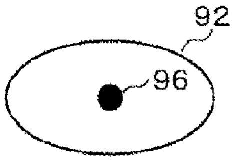
FIG. 9B is a diagram illustrating functions of the false detection estimation unit according to the first example.
Figure 9C:
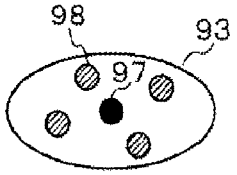
FIG. 9C is a diagram illustrating functions of the false detection estimation unit according to the first example.

First, assuming that the true observation value corresponding to the supplemented target is a maximum of 1 point, FIG. 9A illustrates a normal case, and whether or not the observation value 95 is caused by the target of the prediction value 94 is determined. In FIG. 9B, in a case where the observation value does not exist within the prediction range 92, it is determined as non-detected and is used as the non-detected estimation value. In FIG. 9C, in a case where the number of observation values 98 is large with respect to the prediction value 97, it is determined that the false detection rate has increased, and the number of false detections is counted and used as the estimation value of the false detection.

Here, since the value after fusion is used as the prediction value, when any of the plurality of sensors cannot be observed, the track is maintained if the likelihood of another sensor is high, and the non-detected number can be counted.

Figure 10:
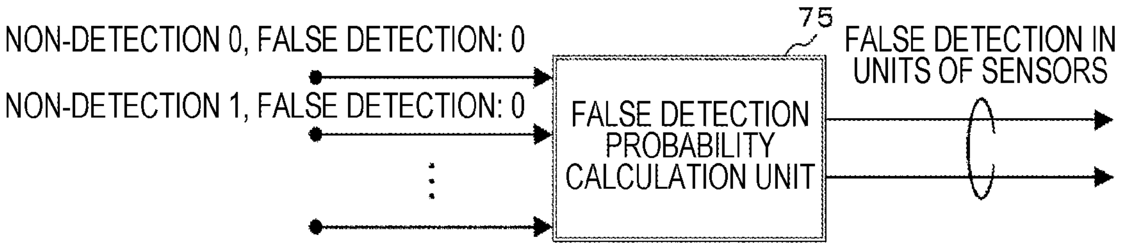
FIG. 10 is a diagram illustrating functions of the false detection estimation unit according to the first example.

The function of the false detection probability calculation unit 75 will be described with reference to FIG. 10.

The false detection probability calculation unit 75 calculates an average value of the number of false detections of a plurality of targets and a frequency of non-detections for each sensor, and outputs the same as false detection estimation in units of sensors. In FIG. 10, an estimation value of the number of non-detections for the number of supplemented targets and the estimation value of the number of false detections are input from the previous block, and average processing and conversion to a detection rate are collectively converted in units of sensors.

The function of the reliability correction unit 76 will be described with reference to FIGS. 11A and 11B.

Figure 11A:
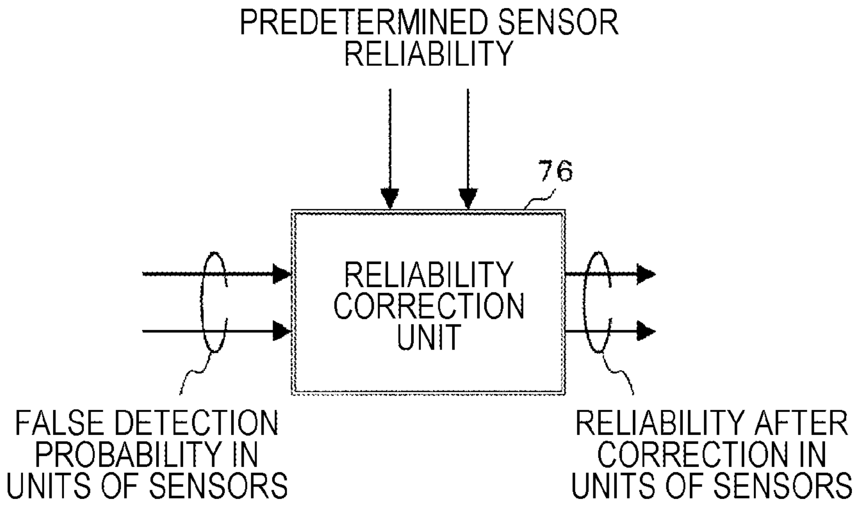
FIG. 11A is a diagram illustrating functions of a reliability correction unit according to the first example.

As illustrated in FIG. 11A, the reliability correction unit 76 corrects the reliability of each predetermined sensor based on the false detection probability in units of sensors, and outputs the corrected reliability. The correction method is executed by selecting a coefficient using table lookup or by performing command conversion on the false detection probability and multiplying the result as a correction coefficient.

Figure 11B:
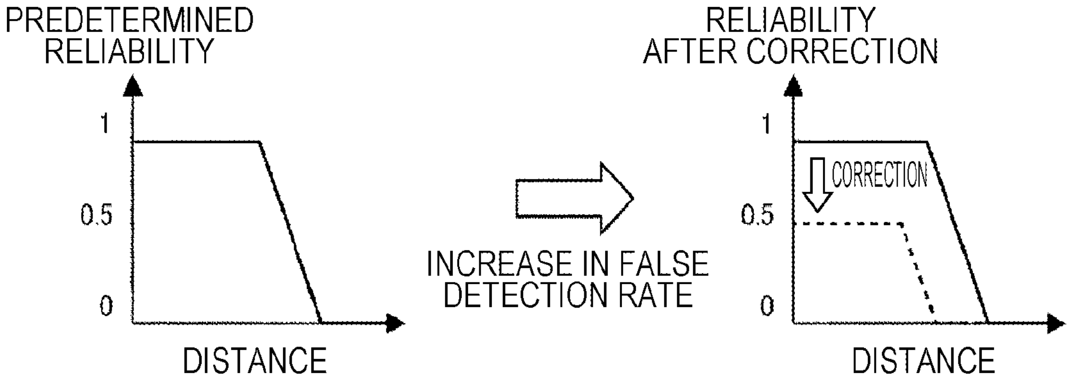
FIG. 11B is a diagram illustrating functions of the reliability correction unit according to the first example.

FIG. 11B illustrates a change in sensor reliability due to correction when the false detection rate is increased. The reliability is reduced when the false detection probability of the sensor becomes high with respect to the sensor reliability according to the distance set as the predetermined reliability. As a result, it is possible to suppress the influence of the sensor with low reliability in the use scene.

As described above, the target detection device according to the first example detects a target based on a plurality of observation values output from a plurality of types of sensors. A target detection device includes a fusion processing unit 73 that processes fusion and outputs a prediction value of a target after fusion, a false detection estimation unit 72 that estimates false detection for each target based on an observation value and a prediction value and outputs a false detection estimation result, a false detection probability calculation unit 75 that calculates a false detection rate for each sensor based on the false detection estimation result, and a reliability correction unit 76 that corrects reliability of a sensor determined in advance based on the false detection rate and outputs the corrected reliability. The fusion processing unit 73 processes fusion based on the prediction value, the false detection estimation result, and the corrected reliability. The fusion processing unit 73 processes fusion and outputs a state vector, a covariance matrix, or an existence probability.

The false detection estimation unit 72 estimates a non-detection rate and a false detection rate for each target using the prediction value. In addition, the false detection estimation unit 72 calculates the frequency of non-detection for each sensor based on the presence or absence of an observation value existing within the estimation range of the observation value, calculates the frequency of false detection for each sensor based on the number of observation values existing within the estimation range of the observation value, and estimates the false detection for each target using the frequency of non-detection and the frequency of false detection.

In addition, when the observation value does not exist within the estimation range, the false detection estimation unit 72 determines as non-detection and uses it as an estimation value of the non-detection rate, and when at least one observation value exists within the estimation range, the false detection estimation unit counts the number of false detections and uses it as an estimation value of the false detection rate.

In addition, the false detection estimation unit 72 estimates false detection for each target by using an average or statistical process of false detection estimation results over a plurality of time steps. Furthermore, the false detection estimation unit 72 estimates false detection for each target by using a prediction value after fusion in a temporally previous step.

In addition, the false detection probability calculation unit 75 calculates an average value of the number of false detections of a plurality of targets and a frequency of non-detection for each sensor by using an estimation value of non-detection and an estimation value of false detection as false detection estimation results, and calculates a false detection rate for each sensor.

The reliability correction unit 76 calculates a coefficient by performing command conversion on the false detection rate, and corrects the reliability of the sensor by multiplying the reliability of the sensor determined in advance as a correction coefficient. In addition, in a case where the sensor reliability according to the distance is set in advance as the reliability of the sensor, the reliability correction unit 76 corrects the reliability of the sensor so as to reduce the sensor reliability in a case where the false detection rate becomes high.

According to the first example, a good fusion result is obtained even in a scene where the reliability of the sensor changes. In this manner, the reliability of the sensor can be appropriately set according to the use scene to improve the fusion result of the plurality of sensors.

Second Example

Figure 12:
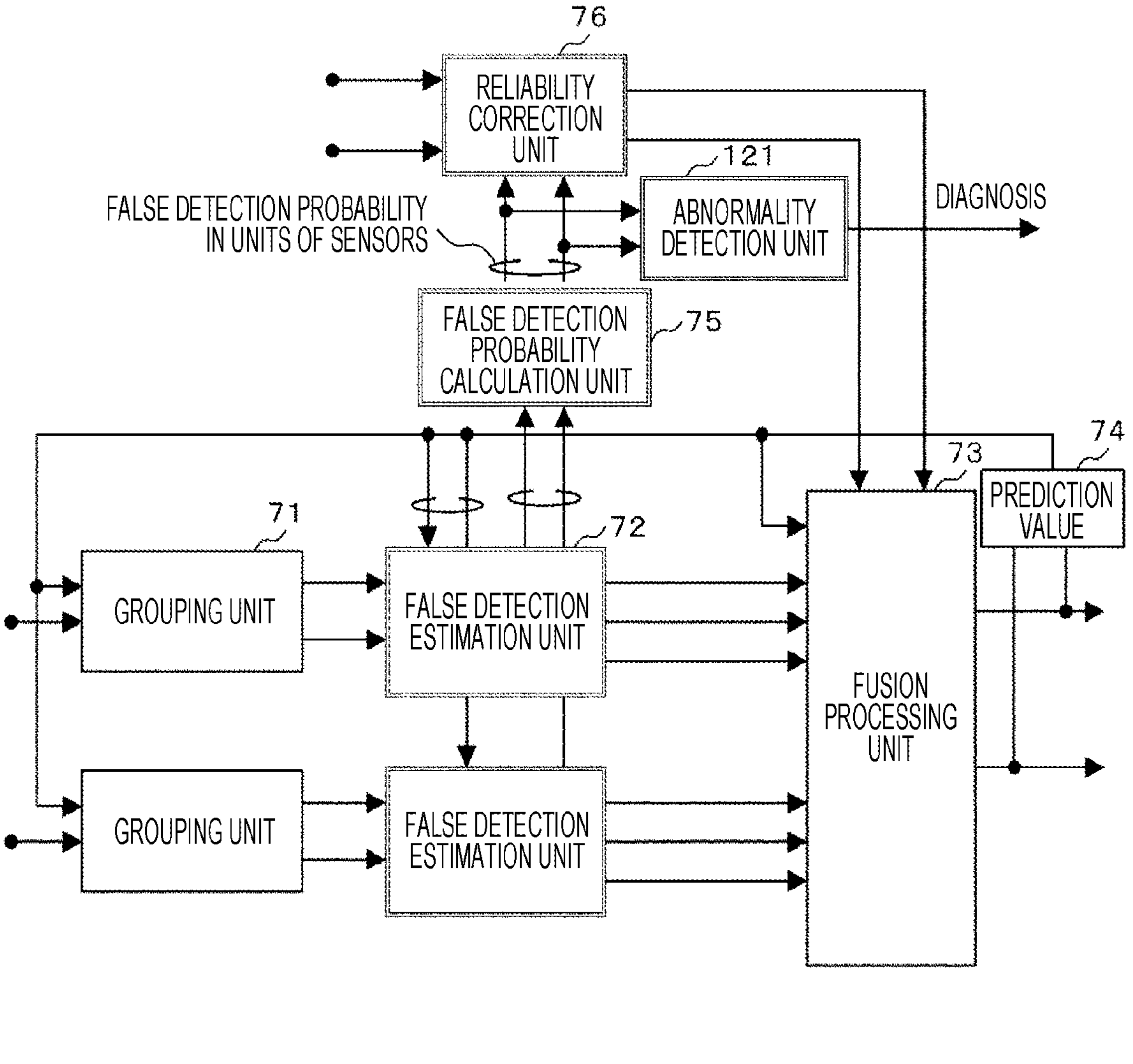
FIG. 12 is a diagram illustrating a configuration of a target detection device according to a second example.

A configuration of a target detection device of a second example will be described with reference to FIG. 12. FIG. 12 illustrates functional blocks of a target detection device using sensor fusion having an abnormality detection function of a sensor.

In FIG. 12, an abnormality detection unit 121 that detects an abnormality of a sensor from a false detection probability in units of sensors is newly added. Other configurations are the same as those of the target detection device of the first example illustrated in FIG. 7, and thus the description thereof will be omitted.

When the increase in the false detection rate of the sensor becomes steady, the deterioration factor can be regarded as not the external environment but the sensor itself. The abnormality detection unit 121 detects an abnormality of the sensor by raising an alert when a situation in which false detection is high continues for a certain period of time or more.

Third Example

Figure 13:
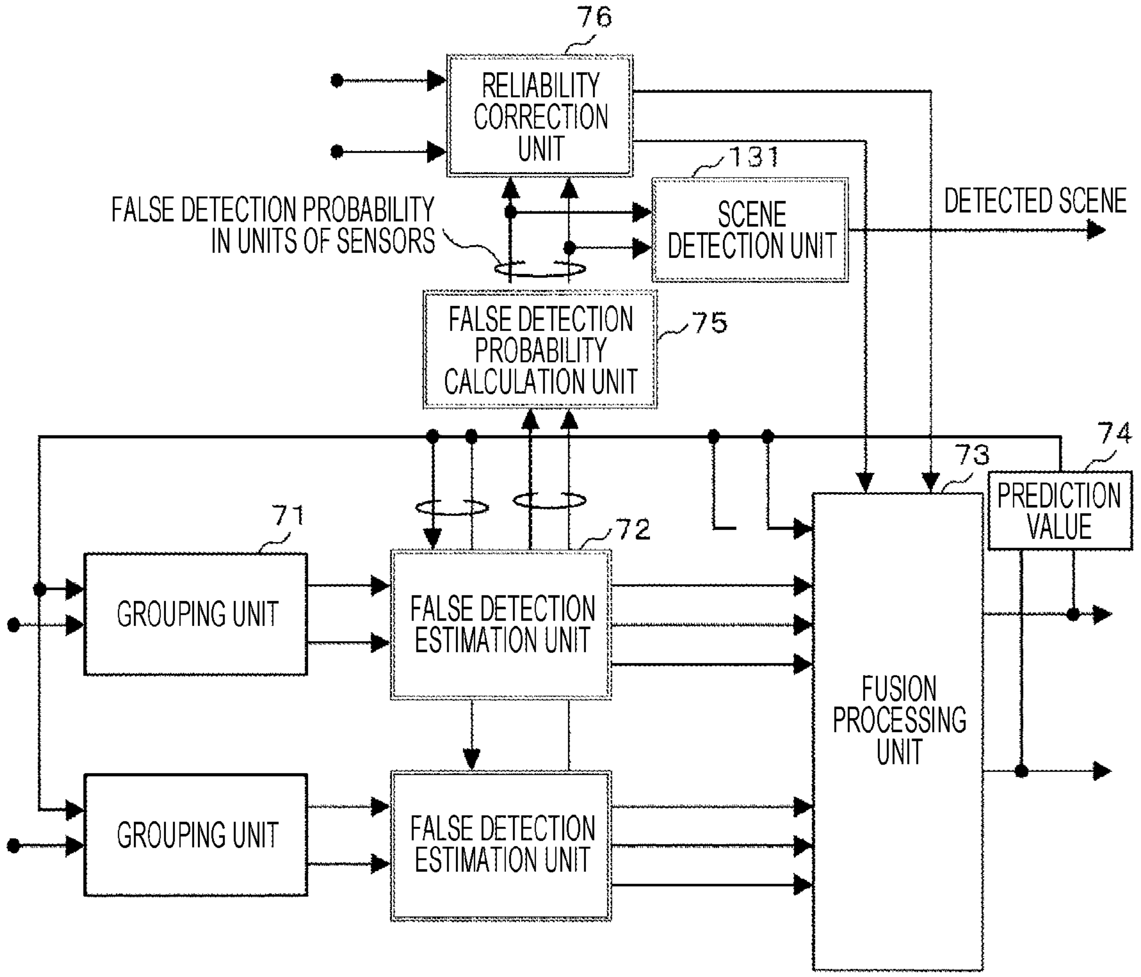
FIG. 13 is a diagram illustrating a configuration of a target detection device according to a third example.

A configuration of a target detection device of a third example will be described with reference to FIG. 13. FIG. 13 illustrates functional blocks of a target detection device using sensor fusion having a scene detection function of a sensor.

In FIG. 13, a scene detection unit 131 that detects a scene using a false detection probability in units of sensors as an input is newly added. Other configurations are the same as those of the target detection device of the first example illustrated in FIG. 7, and thus the description thereof will be omitted.

In the third example, it is possible to estimate which sensor is not good at by a change in the false detection rate in units of sensors. The scene detection unit 131 performs scene detection using the false detection probability in units of sensors as an input, and inputs the detected scene to the analysis plan determination unit 15 in FIG. 1.

For example, in the tunnel, the false detection rate of millimeter wave increases due to the reflected wave. Therefore, if false detection of millimeter wave rapidly increases while there is no significant change in other sensors, it can be estimated that it is surrounded by an object with high reflectance or an object with high reflectance exists at the periphery.

Furthermore, when the detection rate by the camera decreases, blown-out highlights and rainfall due to adversity, occlusion due to mud splashes, vehicle crossing at a relatively close distance, occurrence of sudden obstacles, and the like can be estimated. With regard to Lidar, non-detection of an object having high reflectance occurs.

In the third example, in the sensor fusion, it is possible to improve the characteristic deterioration caused by the strength and weaknesses of the sensor in the use scene.

In the above example, a target detection device including a fusion object recognition unit that receives a plurality of pieces of output data from a plurality of types of sensors and detects a target based on the plurality of pieces of output data includes a false detection estimation unit that estimates a false detection of the target based on a detection result of the target after fusion in a temporally previous step; and a sensor reliability detection unit that estimates reliability of a sensor in a current scene in units of the plurality of types of sensors based om the estimation result of the false detection. Then, the target is detected on the basis of the corrected reliability based on the reliability of the sensor, the estimation result of the false detection, and the output data.

Furthermore, as the reliability of the sensor, a frequency of non-detection and false detection for each sensor is used. The frequency of non-detection for each sensor is calculated from the prediction value after the fusion on the basis of the presence or absence of an observation value existing within an estimation range of the observation value. The frequency of non-detection for each sensor is calculated from the prediction value after the fusion on the basis of the number of observation values existing within the estimation range of the observation value.

In addition, the correction based on the reliability of the sensor is performed by referring to a coefficient by table lookup based on the reliability of the sensor calculated by the sensor reliability detection unit, or using a coefficient calculated in a lookup table having both the reliability of the sensor calculated by the reliability detection unit and the reliability of a predetermined sensor as inputs. The correction based on the reliability of the sensor is performed by calculating a coefficient by a command conversion having the reliability of the sensor calculated by the sensor reliability detection unit as an input, and multiplying the existing sensor reliability by the coefficient. In addition, the estimation of the estimation result of false detection is performed based on an average or statistical process of false detection designation results over a plurality of time steps.

The device has a scene detection function of estimating a current scene by using reliability in units of sensors from the sensor reliability detection unit that estimates reliability of a sensor in a current scene in units of the plurality of types of sensors as an input.

Furthermore, the device has an abnormality detection function of detecting an abnormality such as aging or a failure of a sensor by using reliability in units of sensors from a sensor reliability detection unit that estimates reliability of a sensor in a current scene in units of the plurality of types of sensors as an input.

According to the above example, the target detection device that can obtain a good fusion result even in a scene where the reliability of the sensor changes can be realized.

Note that the present invention is not limited to the examples described above, and includes various modified examples and equivalent configurations within the spirit of the appended claims. For example, the above-described examples have been described in detail for the sake of easy understanding of the present invention, and the present invention is not necessarily limited to those having all the described configurations.

For example, in the target detection device of the first example illustrated in FIG. 7, the predetermined reliability is externally input to the reliability correction unit 76, but the present invention is not limited thereto, and the predetermined reliability may be held in a register or the like of the reliability correction unit 76.

Furthermore, a part of the configuration of a certain example may be replaced with the configuration of another example. In addition, the configuration of another example may be added to the configuration of a certain example. Furthermore, for a part of the configuration of each example, other configurations may be added, deleted, and replaced.

In addition, some or all of the above-described configurations, functions, processing units, processing means, and the like may be realized by hardware by, for example, designing with an integrated circuit, or may be realized by software by a processor interpreting and executing a program for realizing each function.

Information such as a program, a table, and a file for realizing each function can be stored in a storage device such as a memory, a hard disk, and a solid state drive (SSD), or a recording medium such as an IC card, an SD card, and a DVD.

In addition, control lines and information lines indicate those that are considered necessary for the description, and not all control lines and information lines necessary for implementation are necessarily illustrated. In practice, it may be considered that almost all the configurations are connected to each other.

REFERENCE SIGNS LIST

11 sensor
12 feature extraction unit
13 tracking/object detection unit
14 sensor fusion unit
15 analysis plan determination unit
16 vehicle control unit
21 sensor
22 feature extraction unit
23 tracking/object detection/sensor fusion unit
24 analysis plan determination unit
25 vehicle control unit
31 tracking
32 prediction update
33 sensor fusion
41 sensor fusion
42 prediction update
71 grouping unit
72 false detection estimation unit
73 fusion processing unit
74 prediction value
75 false detection probability calculation unit
76 reliability correction unit
121 abnormality detection unit
131 scene detection unit

The invention claimed is:

1. A target detection device that detects a target based on a plurality of observation values output from a plurality of types of sensors, the target detection device comprising a processor configured to:

process fusion and output a prediction value of the target after fusion;

estimate a false detection for every target based on the observation value and the prediction value and outputs a false detection estimation result;

calculate a false detection rate for every sensor based on the false detection estimation result, the false detection rate being determined using an average or statistical process of false detection estimation results over a plurality of time steps; and correct a predetermined reliability of the sensor defined in advance as a distance-dependent function based on the false detection rate, and output the corrected reliability, wherein the processor is further configured to process the fusion based on the prediction value, the false detection estimation result, and the corrected reliability.

2. The target detection device according to claim 1, wherein the processor is further configured to process the fusion and output a state vector, a covariance matrix, or an existence probability.

3. The target detection device according to claim 1, wherein the processor is further configured to estimate a non-detection rate and a false detection rate for each target using the prediction value.

4. The target detection device according to claim 3, wherein the processor is further configured to calculate frequency of non-detection for each sensor based on presence or absence of the observation value existing within an estimation range of the observation value, calculate frequency of false detection for each sensor based on a number of observation values existing within the estimation range of the observation value, and estimate false detection for each target using the frequency of non-detection and the frequency of false detection.

5. The target detection device according to claim 4, wherein the processor is further configured to:

determine a presence of a non-detection and use the non-detection as an estimation value of the non-detection rate when the observation value does not exist within the estimation range; and count the number of false detections and use the number of false detections as an estimation value of the false detection rate when at least one observation value exists within the estimation range.

6. The target detection device according to claim 5, wherein the processor is further configured to use an estimation value of the non-detection and an estimation value of the false detection as the false detection estimation result to calculate an average value of the false detection and a frequency of the non-detection of a plurality of targets for each sensor and calculate the false detection rate for each sensor.

7. The target detection device according to claim 1, wherein the processor is further configured to estimate the false detection for each target using the prediction value after fusion in a temporally previous step.

8. The target detection device according to claim 1, wherein the processor is further configured to correct the predetermined reliability by calculating a coefficient by performing a command conversion on the false detection rate, and multiplying the coefficient on the reliability of the sensor defined in advance as a correction coefficient.

9. The target detection device according to claim 1, wherein the processor is further configured to correct the predetermined reliability of the sensor by calculating a coefficient from the false detection rate by indexing a table lookup from a stored array indexing false detection rate and distance.

10. The target detection device according to claim 1, wherein the processor is further configured to detect an abnormality of the sensor based on the false detection rate of each sensor.

11. The target detection device according to claim 1, wherein the processor is further configured to detect a scene of the sensor based on the false detection rate of each sensor.

12. The target detection device according to claim 1, wherein the processor is further configured to:

group the prediction value and the observation value, generate group information indicating a correspondence status between the prediction value and the observation value, estimate the false detection for each target with reference to the group information, and process the fusion with reference to the group information.

13. A target detection device including a processor configured to:

receive a plurality of pieces of output data from a plurality of types of sensors and detect a target based on the plurality of pieces of output data;

estimate a false detection of the target based on a detection result of the target after fusion, the false detection being determined using an average or statistical process of false detection estimation results over a plurality of time steps; and estimate a predetermined reliability of a sensor in a predetermined scene, the predetermined reliability being defined in advance as a distance-dependent function, based on the estimation result of the false detection, wherein the target is detected based on the estimated reliability based on the predetermined reliability of the sensor, the false detection estimation results, and the output data.

14. A target detection method that detects a target based on a plurality of observation values output from a plurality of types of sensors, the target detection method comprising:

processing fusion and outputting a prediction value of the target after fusion;

estimating a false detection for each target based on the observation value and the prediction value and outputting a false detection estimation result;

calculating a false detection rate for each sensor based on the false detection estimation result, the false detection being determined using an average or statistical process of false detection estimation results over a plurality of time steps; and correcting a predetermined reliability of the sensor, the predetermined reliability being defined in advance as a distance-dependent function, by applying a correction based on the averaged false detection rate and outputting the corrected reliability, wherein the fusion processing step processes the fusion based on the prediction value, the false detection estimation result, and the corrected reliability.

* * * * *